United States Patent [19]

Nakajima

[11] Patent Number: 4,564,867
[45] Date of Patent: Jan. 14, 1986

[54] VIDEO DISC RECORDING AND REPRODUCING DEVICE FOR VIDEO DISCS HAVING RECOGNITION SIGNAL INDICATIVE OF CONTENT OF ASSOCIATED PROGRAM SIGNAL

[75] Inventor: Tohru Nakajima, Saitama, Japan

[73] Assignee: Universal Pioneer Corporation, Tokyo, Japan

[21] Appl. No.: 286,222

[22] Filed: Jul. 23, 1981

[30] Foreign Application Priority Data

Jul. 24, 1980 [JP] Japan .................. 55-104844[U]
Mar. 16, 1981 [JP] Japan .................. 56-36611[U]

[51] Int. Cl.[4] ................................. H04N 5/76
[52] U.S. Cl. ............................... 358/342; 358/343; 360/27; 369/48
[58] Field of Search ................... 369/47–49, 369/86, 89–90, 61–62, 93–95; 358/341–343; 179/1 GM; 360/27, 19.1

[56] References Cited

U.S. PATENT DOCUMENTS

| | | | |
|---|---|---|---|
| 3,105,117 | 9/1963 | Frank | 179/1 GM |
| 3,281,151 | 10/1966 | Kaprelian et al. | 369/94 |
| 3,401,237 | 9/1968 | Takayanagi | 369/62 |
| 3,787,629 | 1/1974 | Limberg | 179/1 GM |
| 3,881,063 | 4/1975 | Mawake et al. | 179/1 GM |
| 3,934,263 | 1/1976 | Palmer | 358/343 |
| 3,980,832 | 9/1976 | Nakamura et al. | 179/1 GM |
| 4,013,841 | 3/1977 | Ohkubo et al. | 369/49 |

OTHER PUBLICATIONS

Kenney et al., Signal Processing for a Video Disc System (VLP) Transactions BTR, 8/74, pp. 217–229.

Primary Examiner—Robert L. Richardson
Attorney, Agent, or Firm—Sughrue, Mion, Zinn, Macpeak & Seas

[57] ABSTRACT

A video disc and reproducing device therefor in which a recognition signal for identifying the content of an audio program, specifically whether two recorded audio signals are in the stereophonic mode or in a split mode, is recorded along with the audio signal and a video signal. The recognition signal may be multiplexed in either a frequency division multiplex system or in a time division multiplex system. The reproducing device includes a selection switch provided for selecting whether a pair of sum and difference signals, in the stereophonic mode, or whether the first and second audio signals directly, in the case of the multiplex mode, are coupled to inputs of a modulator which outputs an RF signal adapted to be inputted to a television tuner. A pilot signal is included with the output of the modulator. The pilot signal is amplitude modulated with one of two different frequency sinewaves. The one of the sinewaves which is used to modulate the pilot signal and the selection switch is controlled by a recognition signal detector.

5 Claims, 3 Drawing Figures

VIDEO DISC RECORDING AND REPRODUCING DEVICE FOR VIDEO DISCS HAVING RECOGNITION SIGNAL INDICATIVE OF CONTENT OF ASSOCIATED PROGRAM SIGNAL

BACKGROUND OF THE INVENTION

The present invention relates to a video disc and to a reproducing device therefor. More particularly, the invention relates to a video disc on which video and audio data signals are recorded in a multiplex mode and to a reproducing device therefor.

In general, both video data and audio data are recorded on a video disc. Two channels are provided for recording the audio data so that a stereo program or a "split" program (a program with two independent audio channels such as a bilingual program) can be recorded on the video disc. FIG. 1 shows a frequency spectrum of a data signal recorded on such a video disc. The two-channel audio signals and the video signal are converted into RF signals by frequency-modulating respective carrier signals before recording.

In general, the output of a video disc player (VDP) for reproducing data recorded on such a video disc includes, besides a baseband video signal and two-channel audio signals, a VHF signal generated, for example, according to the NTSC color television system. This signal is provided as a line output by the video disc player which can be connected directly to the VHF antenna terminals of a user's television set.

In the case where the audio signals are for a stereo program, a signal which is the sum of the two-channel signals or the difference between the two-channel signals is processed similarly as in the case of an ordinary stereophonic broadcast, and the relevant carrier signals are subjected to frequency modulation so that the signal thus processed and the video signal are converted into a signal in the VHF band which is outputted as a VHF signal.

In the case where the two audio signals are for a split program, the two independent audio signals are also processed similarly as in a television sound multiplex broadcast (currently in widespread use in Japan) and the carrier signals are subjected for frequency modulation so that the signals thus processed and the video signal are converted into a signal in the VHF band which is outputted as a VHF signal.

If the output VHF signal of the video disc player is connected to the VHF signal input of a home television set, then the sound multiplex program can be enjoyed if the television set is equipped with appropriate multiplex stereo receiving circuits. In this case, it is necessary to discriminate whether a sound multiplex program recorded on the video disc is a stereo program or a multiplex program and to process the output VHF signal output according to the discrimination result. In order to do so, or to obtain a desired VHF signal output, the user has to operate an audio channel change-over switch of the video disc player manually. Thus, the above-described system is disadvantageous in that the manual operation is troublesome and erroneous operations may be caused by the manual operation.

SUMMARY OF THE INVENTION

An object of the invention is thus to provide a video disc system in which a recognition signal for identifying the content of an audio program according to the sound multiplex system is recorded in advance so that it can automatically be discriminated during reproduction with a video disc player and the output of the video disc player, i.e. a VHF signal output is provided in conformance to the conditions under which the video signal has been recorded.

In order to accomplish this, the invention provides a video disc on which the video signal and two-channel audio signals are recorded in a multiplex mode wherein a recognition signal for indicating whether the audio signals are stereo program signals or split program signals is recorded in a multiplex mode. Preferably, the recognition signal is multiplexed according to a frequency division multiplexed recording system in which recording is carried out using a carrier signal of a different frequency from carrier signals used for recording the audio signals. Otherwise, the recognition signal may be multiplexed together with the video signal and audio signals in accordance with a time division multiplex mode.

Further in accordance with the invention, a reproducing device is provided for reproducing such a video disc. The reproducing device includes detecting means for detecting the video signal, the recognition signal, and the first and second audio signals read from the disc. Selection means is provided for selecting one of a pair of sum and difference signals of the first and second channel audio signals or a pair of the first and second channel audio signals in response to the recognition signal. First modulation means modulates a sub-carrier in response to one of the pair of signals selected by the selection means. Output means produces an oscillation signal of a frequency determined in response to the recognition signal. Second modulation means modulates a pilot signal with the oscillation signals. Outputs of the first and second modulation means and the other of the pair of signal selected by the selection means together with the video signal are modulated so as to produce a standard RF television signal.

DESCRIPTION OF THE PREFERRED EMBODIMENTS

A preferred embodiment of the invention will be described with reference to the accompanying drawings.

Figure 1:
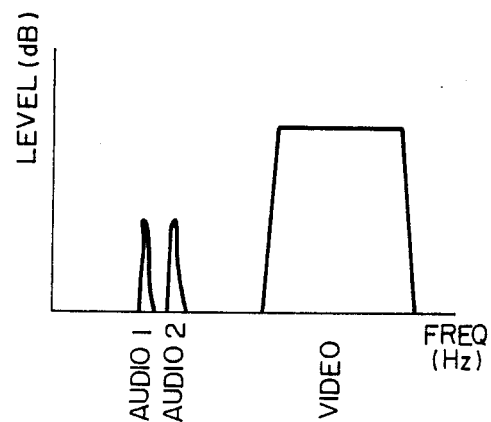
FIG. 1 is a graphical representation indicating the frequency spectrum of data recorded on a conventional video disc.
Figure 2:
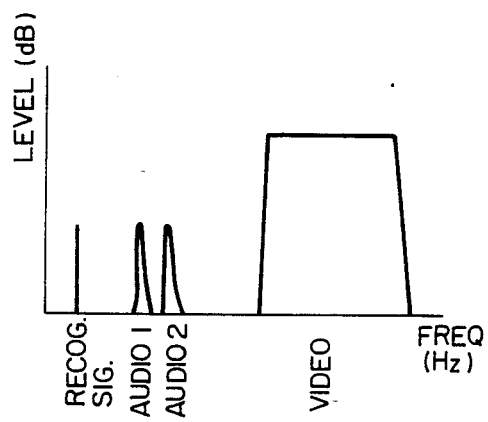
FIG. 2 is also a graphical representation indicating the frequency spectrum of data recorded on one example of a video disc according to the invention.

FIG. 2 shows the frequency spectrum of a data signal to be recorded. Similarly as in the prior art described with reference to FIG. 1, audio data of two channels and a video data signal are recorded by frequency-modulating individual carrier signals. In addition, by using a carrier signal of a different frequency from these carrier signals, a stereo multiplex program recognition signal is multiplexed and recorded. The recognition signal may be recorded so that it is present for either one of a stereo program or a split program. A recording system may also be employed in which the recognition signal is employed as a predetermined sub-carrier signal with the modulation frequency changed according to whether a stereo program or a split program is then present.

Each of the above-described systems is a frequency division multiplex recording system in which the recognition signal, the video data signal and the audio data signal are processed in a frequency division mode. However, a time division multiplex recording system may also be employed. In other words, a system may be employed in which a recognition pulse is inserted at a predetermined time during the vertical blanking period of a video signal whereby the presence or absence of the recognition pulse or coded pulse corresponds to the type of audio program.

Figure 3:
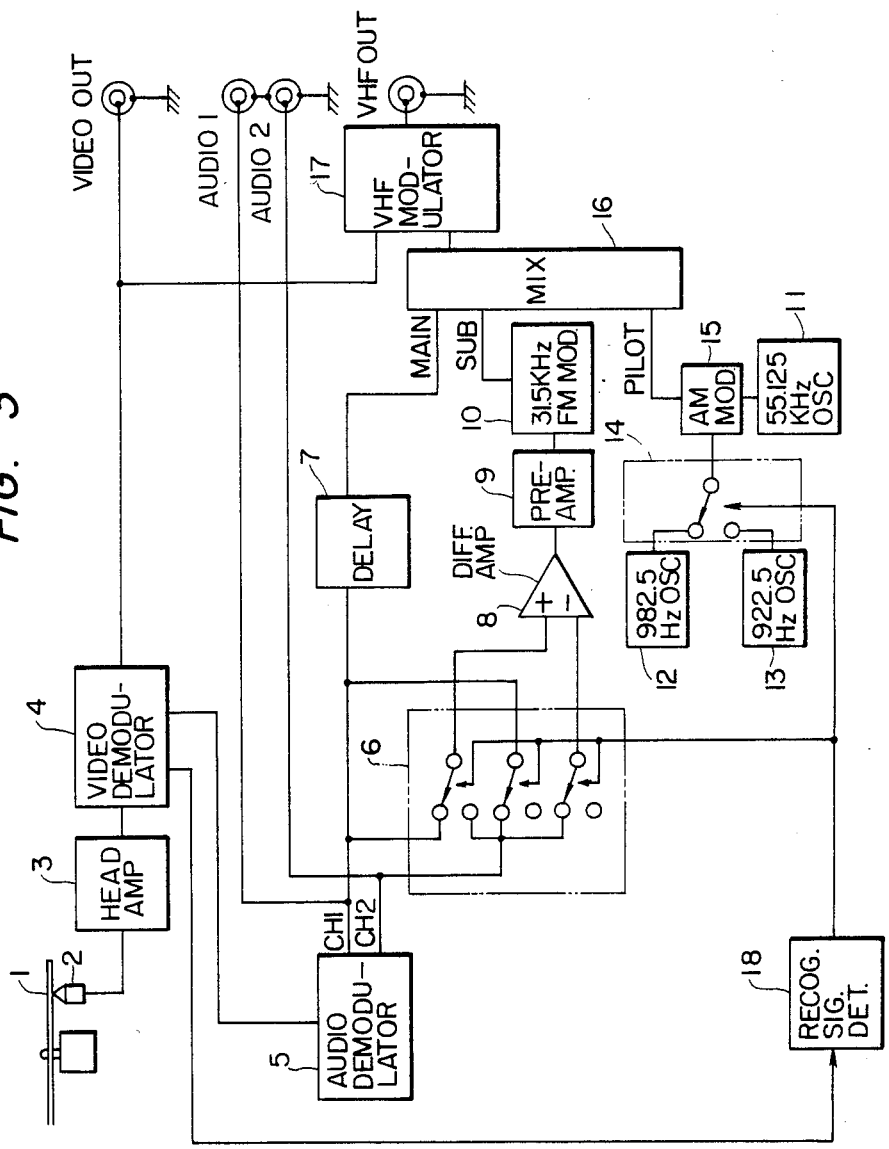
FIG. 3 is a block diagram showing a video disc player for reproducing data recorded on a video disc according to the invention.

FIG. 3 is a block diagram showing a video disc player (VDP) which reproduces data recorded on a video disc according to the invention and provides video and audio outputs and a VHF signal output. A sound multiplex program recognition signal is recorded on a video disc 1 in a frequency division mode or in a time division mode. The data recorded on the video disc 1 is sensed and converted into an electrical signal by a pickup 2. The electrical signal, after being amplified by a head amplifier 3, is applied to a video signal demodulating circuit 4 where it is demodulated into a video signal output (VIDEO OUT). On the other hand, the audio signal is demodulated into audio signals in two channels by an audio signal demodulating circuit 5. The two-channel signals are employed as audio outputs 1 and 2 (AUDIO 1 and AUDIO 2) and are applied to a matrix switching circuit 6.

The matrix switching circuit 6 operates to switch the two-channel signals separately depending on whether they are for a stereo program or a split program. FIG. 3 shows the state of the matrix switching circuit 6 in the case of the stereo program. In this case, in order to obtain the difference between the two-channel signals, namely, a sub-signal, the channel signal outputs are applied to a differential amplifier 8. The sub-signal output of the differential amplifier 8 is processed by a pre-emphasis circuit 9. The output of the circuit 9 is applied to a modulation circuit 10 in order to frequency-modulate the sub-carrier 31.5 kHz of the sub-signal for television sound multiplex broadcasts. On the other hand, a main-signal, which is the sum of the two-channel signals, is applied to a delay circuit 7 where it is delayed for a predetermined period of time. Th main-signal thus delayed is applied to a mixer 16 together with the FM sub-carrier signal of the sub-signal.

Oscillators 12 and 13 for generating sinewave signals of 982.5 Hz and 922.5 Hz are employed ot provide a pilot signal for television sound multiplex broadcasts. One of these signals is selected by a switch 14. The signal thus selected is applied to an amplitude modulation circuit 15 to amplitude-modulate the pilot signal carrier at 55.125 kHz which is the output of an oscillator 11. The signal thus modulated, namely, a multiplex control signal (or the pilot signal) is applied to the aforementioned mixer 16. The output of the mixer 16 and the video signal output are subjected to frequency modulation by a VHF modultation circuit 17, as a result of which a television sound multiplex signal according to the NTSC television system is provided as a VHF signal output (VHF OUT). In the case of the stereo program as shown in FIG. 3, the signal at 982.5 Hz is selected by the switch 14.

In the case of a split program such as a bilingual program, the matrix switching circuit 6 operates to apply only the second channel signal to the differential amplifier 8. For the main-signal the first channel signal is processed independently while for the sub-signal the second channel signal is processed independently. The switching circuit 14 selects the signal at 922.5 Hz which is applied to the amplitude modulation circuit 15.

The operations of the matrix switching circuit 6 and the switch 14 are controlled by the output of a program recognition signal detecting circuit 18 which automatically detects the recognition signal provided by the video signal demodulating circuit 4. The detecting circuit 18 is made up of a filter or the like which extracts only the recognition signal frequency, in the case where data is recorded on the video disc 1 according to the frequency division multiplex recording system. On the other hand, in the case where data is recorded on the video disc 1 according to the time division multiplex recording system, a gate pulse is formed in synchronization with the period during which the the recognition signal is recorded, and the detecting circuit 18 is so constructed that the detecting operation is carried out with the aid of a gate output provided by the gate pulse.

As described above, according to the invention, merely by addition a simple recognition signal detecting circuit to the video disc player, not only can the type of programs be automatically discriminated, but also the sound multiplex modulation process is automatically carried out. The above-described device eliminates a troublesome manual operation and erroneous operation.

What is claimed is:

1. A video disc system, comprising; a video disc on which a video signal and two-channel audio signals are recorded in a multiplex mode, a recognition signal multiplexed with said video and audio signals, detecting means for detecting said recognition signal upon playing said video disc, said recognition signal identifying whether said audio signals are stereo program signals or split program signals recorded in a multiplex mode, signal reproduction means for reproducing said two-channel audio signals and video signal, respectively, selection means for selecting processing of said reproduced two-channel audio signals as (1) a pair of sum and difference signals or, (2) a pair of audio signals processed independently of each other, in response to said recognition signal detected by said detecting means.

2. The video disc system as claimed in claim 1 wherein said recognition signal is multiplexed according to a frequency division multiplex recording system in which recording is carried out using a carrier signal different in frequency from carrier signals used for recording said audio signals.

3. The video disc system as claimed in claim 1 wherein multiplexing of said recognition signal is carried out together with said video signal and audio signals in accordance with a time division multiplex system.

4. A reproducing device for reproducing a video disc on which a video signal, first and second audio signals, and a recognition signal for identifying whether the audio signals are stereo program signals or split program signals are recorded in a multiplex mode, comprising: means for detecting said video signal, said recognition signal, and said first and second audio signals from said disc; selection means for selecting to process said first and second audio signals as one of a pair of sum and difference signals and a pair of audio signals processed independently of each other in response to said recognition signal; first modulation means for modulating a sub-carrier in response to one of the pair of signals selected by said selection means; output means for outputting an oscillation signal at a frequency determined in response to said recognition signal; second modulation means for modulating a pilot signal with said oscillation signal; and means for converting outputs of said first and second modulation means, the other signal of said pair of signals selected by said selection means and said video signal into an RF frequency television signal.

5. A reproducing device for reproducing a video disc on which a video signal, first and second audio signals, and a recognition signal for identifying whether the audio signals are stereo program signals or split program signals are recorded in a multiplex mode, comprising: a video demodulator operating in response to an output signal from a sensor head for outputting a video baseband signal; an audio demodulator coupled to an output of said video demodulator for demodulating said first and second audio signals; a recognition signal detecting circuit for producing an output signal representing a state of a sensed recognition signal; a differential amplifier; switch means coupled between said audio demodulator and said differential amplifier and operating in response to an output of said recognition signal detecting circuit for coupling outputs of said audio demodulator to corresponding inputs of said differential amplifier whereby, for a first state of an output of said recognition signal detecting means and corresponding state of said switch means, said switch means couples said first and second audio signals to corresponding inverting and non-inverting inputs of said differential amplifier, and for a second state of the output of said recognition signal detecting means and corresponding state of said switch means, said switch means couples only a predetermined one of said first and second audio signals to a predetermined input of said differential amplifier; first and second sinewave oscillators producing output signals of different frequencies; a pilot carrier signal source; an AM modulator; second switch means for coupling a selected output of one of said first and second sinewave oscillators in response to said output of said recognition signal detecting means to one input of said AM modulator, an output of said pilot signal oscillator being coupled to another input of said AM modulator, wherein said AM modulator modulates an output pilot signal produced by said pilot signal oscillator with a sinewave of frequency determined by the state of said output of said recognition signal detecting means; and means for producing a RF television signal modulated in accordance with said video baseband signal and outputs of said AM modulator, said differential amplifier, and one of said audio signals.

* * * * *